UNITED STATES PATENT OFFICE.

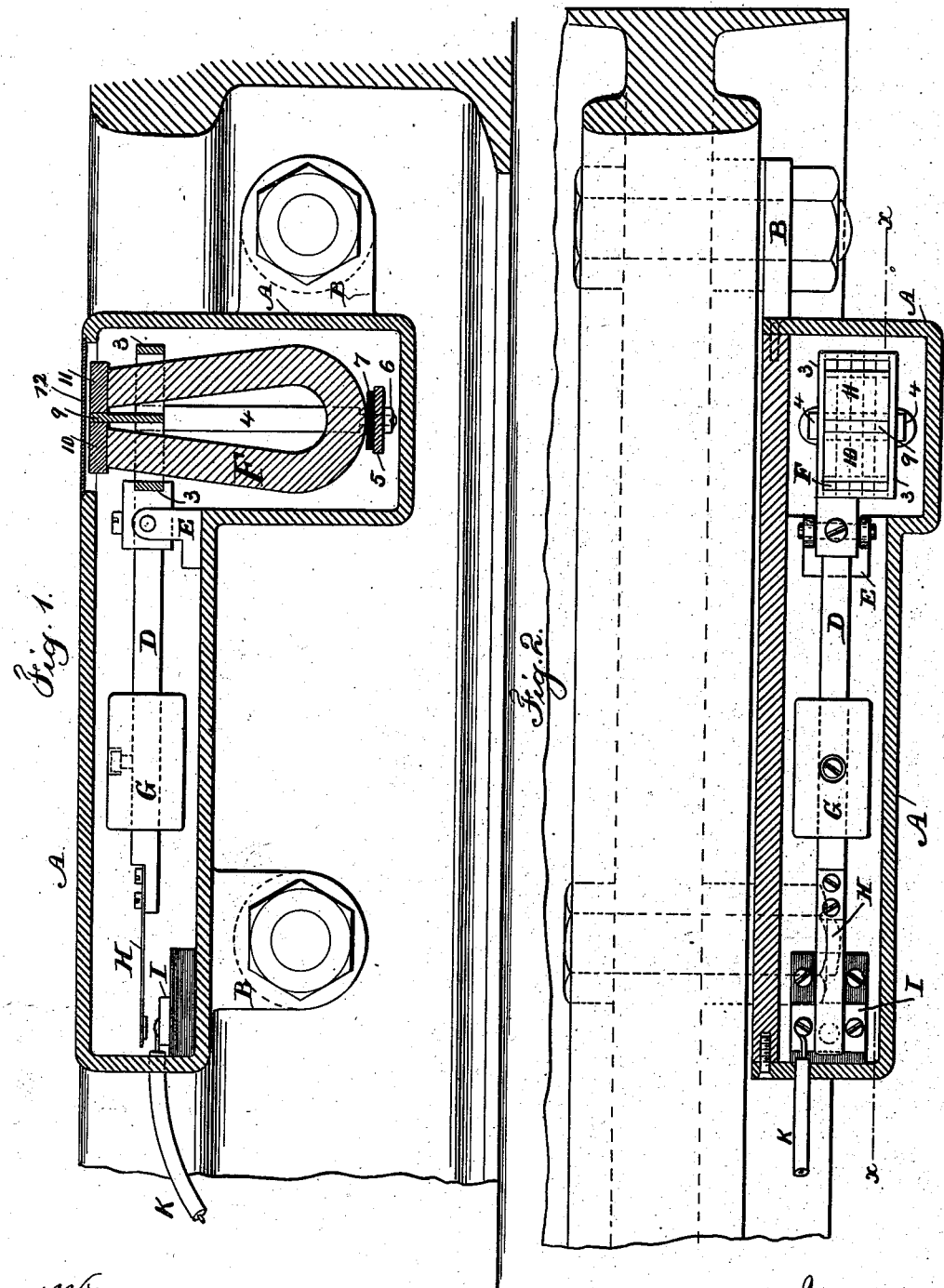

CONSTANT F. DE REDON, OF NEW YORK, N. Y.

ELECTRIC RAILWAY-SIGNAL.

SPECIFICATION forming part of Letters Patent No. 382,515, dated May 8, 1888.

Application filed April 2, 1888. Serial No. 269,256. (No model.)

*To all whom it may concern:*

Be it known that I, CONSTANT FRANÇOIS DE REDON, of the city and State of New York, have invented an Improvement in Electric Railway-Signals, of which the following is a specification.

Electric railway-signals have heretofore been made in which the passage of the wheels of the locomotive or car have opened or closed an electric circuit to a bell or other signaling apparatus; but in these cases difficulty has arisen from snow, ice, or earthy materials obstructing the movements of the parts or interfering between the electrodes, and in addition to this the wheels of the train are not uniform in shape, the new wheels being conical in the tread and the old wheels frequently being grooved, so that the wheel projects downwardly outside of the rail and injures or gives too much motion to the circuit-closing apparatus.

The object of my present invention is to close the electric circuit by the action of a magnet that is attracted by the iron of the passing wheels, such magnet being inclosed within an air-tight box or case that is not liable to be injured by the passage of the wheels, and from which water, dust, or other foreign substances are effectually excluded.

In the drawings, Figure 1 is a vertical section of the circuit-closing mechanism at the line $x\ x$ of Fig. 2, and Fig. 2 is a plan view with the box in section.

The box or case A is of any suitable size or character. Usually it will be made of non-magnetic material, such as brass or copper, and it is provided with flanges B, by which the same is connected to the side of the rail; or flanges may be provided at the bottom, so that the box will rest upon the cross-ties. Within the box is a lever, D, supported by a pivot-block, E, and upon one end thereof is a magnet, F, and this is preferably counterpoised by the adjustable weight G, and upon or connected with the lever D is a circuit-closing spring, H, above the insulated contact-block I, which contact-block I is permanently connected with the insulated electric wire or conductor K, that leads to a suitable battery and an electric bell, or any other suitable signal, that is brought into operation by the passage of the train.

It is preferable to make the magnet F a horseshoe-magnet, composed of layers held within the frame 3, forming part of the lever D, and the straps 4 pass down from this frame 3 at each side of the magnet, and the lower ends are threaded to receive the nuts 6, and there is a cross-bar, 5, preferably of copper, upon which the magnet F rests, and through which bar the ends of the straps 4 pass, and the nuts 6 serve to hold the parts in position, there being a plate, 7, of rubber or other insulating material, between the cross-bar 5 and the base of the magnet F, and between the poles of the magnet F there is a plate, 9, preferably of copper, and the pole-pieces 10 and 11 rest upon the poles of the magnet F and against the sides of the plate 9, and the edges of said pole-pieces are brazed to the sides of the copper plate 9, and said copper plate 9 is fastened at its lower portion to the frame 3.

In the box A, immediately above the magnet F, there is an opening in the thick metal case, which opening is closed by the plate 12, of sheet metal or other suitable material, fastened air-tight at its edges to the said case A, so that but little distance would intervene between the poles of the magnet and the wheels of the locomotive or cars that travel along upon the rails, and these wheels being of iron there is an attraction between the magnet and the iron wheels which causes the magnet and the lever that supports the same to move, and in so doing the electric circuit is either opened or closed.

If the spring H is above the contact-plate I, the circuit will be closed between these points that form the electrodes by the magnet F being attracted by the iron of the wheel; but if the contact-plate I is above the spring H the circuit may remain closed in its normal position, and it will be broken by the movement that the magnet receives by the attraction thereof with the wheels of the passing train.

I do not limit myself to any particular form or shape of the magnet F so long as the same is supported by a balanced lever in such a way that the magnetism will cause the movement of the lever when the wheels of the train pass along adjacent to the magnet, and under all circumstances the case remains closed, so that water, earth, or foreign substances cannot obstruct the movements of the parts or interfere with the electric contact, and the magnetism becomes the source of motion, instead of the parts receiving the movement from the mechanical action of the wheels.

I claim as my invention—

1. The combination, with a closed case, of a lever pivoted within the case, a circuit-closing spring upon the lever, and a magnet supported by such lever and giving motion to the same in consequence of the magnetic attraction between the magnet and the iron of the passing wheels, substantially as set forth.

2. The magnet and a lever with which the magnet is connected and by which it is supported, a circuit-closer upon the lever, and a stationary circuit-closing contact, in combination with the case of non-magnetic material, having a thin plate above the magnet, so that the magnetism is free to act between the magnet and the passing wheels to give motion to the lever and circuit-closing device, substantially as set forth.

3. The combination, with the case, of a lever pivoted within the case, a circuit-closer connected with the lever, a permanent magnet, the poles of which are adjacent to the top of the case, and a frame upon the lever for receiving the magnet, substantially as set forth.

Signed by me this 29th day of March, 1888.

CONSTANT F. DE REDON.

Witnesses:
GEO. T. PINCKNEY,
WILLIAM G. MOTT.